(12) United States Patent
Matsumoto et al.

(10) Patent No.: US 7,336,596 B2
(45) Date of Patent: Feb. 26, 2008

(54) OPTICAL STORAGE MEDIUM

(75) Inventors: Ikuo Matsumoto, Mito (JP); Kenji Tokui, Hitachinaka (JP); Kenichi Shimomai, Mito (JP); Hiroshi Tabata, Mito (JP); Kazuo Yonehara, Hitachinaka (JP)

(73) Assignee: Victor Company Of Japan, Ltd., Kanagawaken (JP)

( * ) Notice: Subject to any disclaimer, the term of this patent is extended or adjusted under 35 U.S.C. 154(b) by 577 days.

(21) Appl. No.: 11/005,775

(22) Filed: Dec. 7, 2004

(65) Prior Publication Data

US 2005/0123710 A1 Jun. 9, 2005

(30) Foreign Application Priority Data

Dec. 8, 2003 (JP) .............................. 2003-408936
Oct. 19, 2004 (JP) .............................. 2004-304237

(51) Int. Cl.
*G11B 7/24* (2006.01)
(52) U.S. Cl. ...................... 369/283; 369/280; 369/288; 369/275.4; 428/64.4
(58) Field of Classification Search .. 369/275.1–275.5, 369/283, 280, 288, 44.13, 286, 277; 428/64.4
See application file for complete search history.

(56) References Cited

U.S. PATENT DOCUMENTS

2004/0202097 A1* 10/2004 Oyake et al. ............... 369/283

FOREIGN PATENT DOCUMENTS

| JP | 02-223030 | 9/1990 |
|----|-----------|--------|
| JP | 09-212917 | 8/1997 |
| JP | 10-283682 | 10/1998 |
| JP | 2003-281791 | 10/2003 |

* cited by examiner

*Primary Examiner*—Ali Neyzari (57) ABSTRACT

An optical disk consists of a first laminated layer structure and a second laminated layer structure. The first structure has a first transparent substrate having a first surface and a second surface on both sides thereof, provided on the first surface being a light-incident plane via which a light beam is to be incident in recording or reproduction, formed alternately on the second surface being a plurality of first lands and first grooves, and a first organic-dye recording layer formed on the second surface to cover the first lands and grooves. The second structure has a second substrate, alternately formed on which are a plurality of second lands and second grooves, a reflective film formed on the second transparent substrate to cover the second lands and grooves, and a second organic-dye recording layer formed on the reflective film to face the second transparent substrate. The first and the second structures are bonded to each other via a bonding layer so that the first and second recording layers are provided between the first and second substrates. A formula $\alpha 1 \geq \cos^{-1}(20/Tb)$ is satisfied in which Tb is a thickness of the reflective film formed on a bottom of each second groove and $\alpha 1$ is an angle between a plane passing through an upper surface of each second land and a side wall of each second groove.

2 Claims, 2 Drawing Sheets

OPTICAL STORAGE MEDIUM

CROSS-REFERENCE TO RELATED APPLICATIONS

This application is based on and claims the benefit of priority from the prior Japanese Patent Application No. 2003-408936 filed on Dec. 8, 2003, and the prior Japanese Patent Application No. 2004-304237 filed on Oct. 19, 2004, the entire contents of which are incorporated herein by reference.

BACKGROUND OF THE INVENTION

The present invention relates to an optical storage medium in or from which data is recorded or reproduced with laser radiation. Particularly, this invention relates to an unrewritable dual-layer optical storage medium having two organic-dye recording layers.

Optical storage media having organic-dye recording layers recently available are, for example, writable compact discs (CD-R) and writable digital versatile disks (DVD-R) for archival recording of music or video data.

DVD-Rs having large storage capacity are especially used for recording video data. There is, however, a demand for larger storage capacity for long-time recording.

One way to achieve larger storage capacity is to make smaller a laser spot so that it can carry highly dense data when a laser beam is radiated onto a recording layer of an optical storage medium from a laser source of a recording/reproducing apparatus.

Possible ways to have a smaller laser spot use a shorter laser wavelength in the range of blue, higher Numerical Aperture (NA) for an objective lens of an optical pickup installed in a recording/reproducing apparatus, etc.

These ways are, however, not feasible in reproduction compatibility with existing DVD recording/reproducing (or reproduction-dedicated) apparatus.

One recently proposed medium structure that achieves larger storage capacity with better reproduction compatibility is a multi-layer, such as, a dual-layer structure in which an optical storage medium have two or more recording layers in laminated layers.

For example, Japanese Patent Publication No. H08 (1996)-23941 discloses a dual-layer optical storage medium in which a reflective layer, a cured resin (as a recording surface), etc., are laminated on one substrate.

Japanese Patent Unexamined Publication No. H10 (1998)-283682 discloses a method of producing a dual-layer optical storage medium having two substrates. Each substrate is made of a transparent resin and has grooves formed thereon. Formed on each substrate by specific procedures are a recording layer and other layers. The substrates are bonded to each other with an ultra-violet cured resin so that the layers are sandwiched therebetween.

Each substrate can be produced through well-known injection molding, like a substrate having a single recording layer. Application of a dye, formation of a reflective film on each substrate can also be done in the same way as or a similar way to such a substrate having a single recording layer.

This type of bonding structure can be achieved with high productivity through well known simple techniques.

Figure 1:
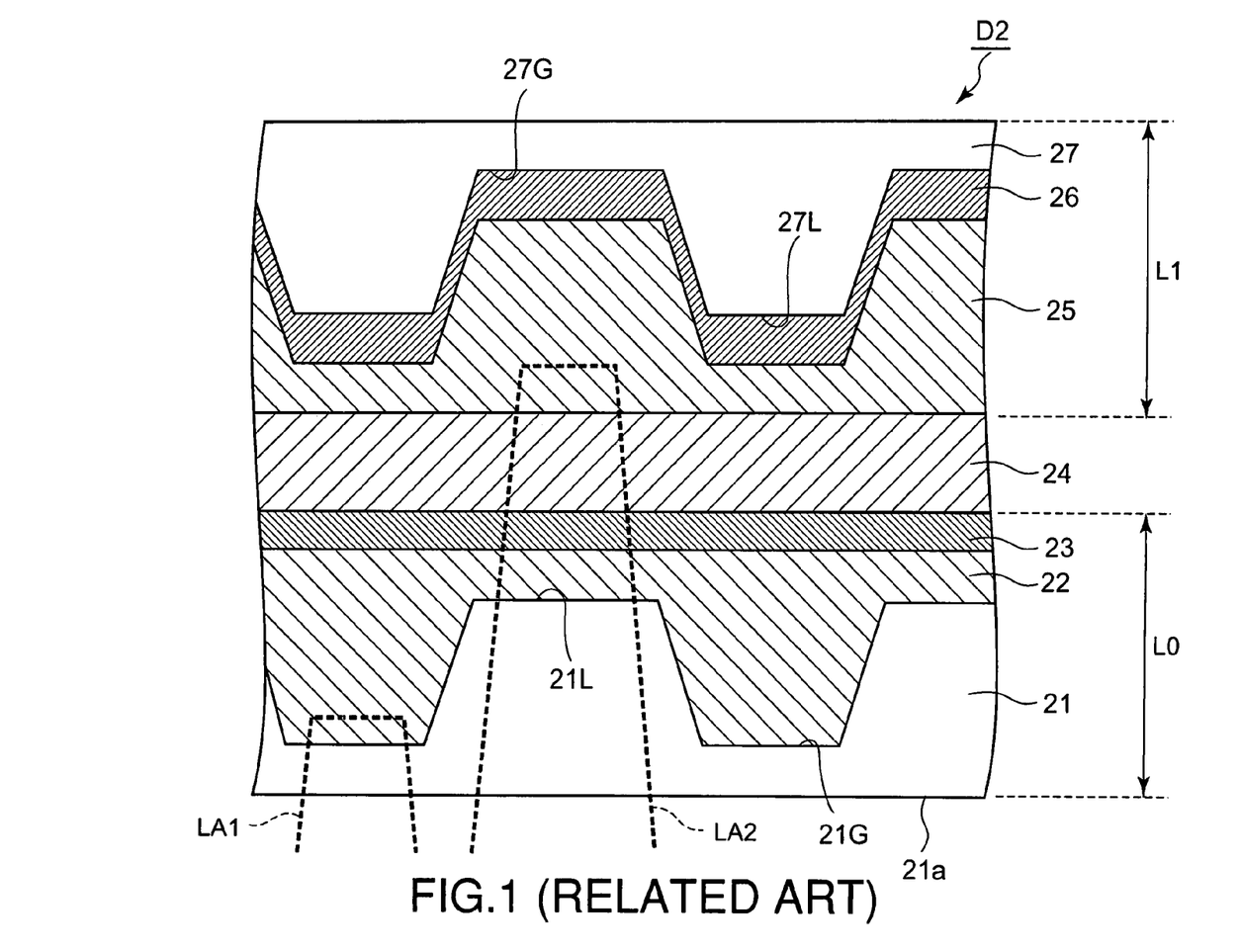
FIG. 1 shows a known optical storage medium.

FIG. 1 shows a dual-layer optical storage medium D2 having such a bonding structure.

The optical storage medium D2 has a first laminated layer structure L0 and a second laminated layer structure L1.

The laminated layer structure L0 consists of a transparent substrate 21, a recording layer 22, and a semi-transparent film 23. One surface of the substrate 21 is a light-incident plane 21a via which a laser beam is incident in recording or reproduction. Spiral or concentric grooves 21G and lands 21L are alternately formed on the other surface of the substrate 21. The grooves 21G and lands 21L are coated with an organic resin (the material of the recording layer 22). Formed on the layer 22 is the semi-transparent film 23 made of a metal or an alloy.

The laminated layer structure L1 consists of a substrate 27, a reflective film 26, and a recording layer 25. Spiral or concentric grooves 27G and lands 27L are alternately formed on the substrate 27. The grooves 27G and lands 27L are covered with the reflective film 26. Applied on the film 26 is an organic resin (the material of the recording layer 25).

The semi-transparent film 23 of the laminated layer structure L0 and the recording layer 25 of the laminated layer structure L1 are bonded to each other via a bonding layer 24.

Further layers may be provided in the laminated layer structure L0 and/or the laminated layer structure L1 for higher performance, reliability, etc.

In recording or reproduction, laser beams LA1 and LA2 are incident on the layers L0 and L1, respectively, via the light-incident plane 21a.

Illustrated in FIG. 1 is a known recording mechanism that is called on-in recording in which data is recorded in the laminated layer structure L0 in on-groove recording whereas another data is recorded in the laminated layer structure L1 in in-groove recording.

In general, data is recorded on convex sections of a substrate, that stick out toward a light-incident plane in on-groove recording. In contrast, data is recorded on concave sections of the substrate, that cave in when viewed from the light-incident plane in in-groove recording.

As illustrated with dot lines in FIG. 1, in the on-groove recording, the laser beam LA1 is incident on the laminated layer structure L0 via the light-incident plane 21a so that data is recorded on the recording layer 22 formed on the grooves 21G. The grooves 21G formed on the substrate 21 are convex sections that stick out toward the plane 21a.

In contrast, in the in-groove recording, the laser beam LA2 is incident on the laminated layer structure L1 via the light-incident plane 21a so that data is recorded on the recording layer 25 formed on the grooves 27G. The grooves 27G formed on the substrate 27 are concave sections that cave in when viewed from the plane 21a.

It is, however, practically difficult to achieve the on-in recording. The following on-on recording is more practical and used often. In this recording mechanism, data are recorded in the laminated layer structures L0 and L1 both in on-groove recording. In detail, recording to the structure L0 is the same as in the on-in recording. In addition, another data is recorded in the structure L1 in such a way that it is recorded on convex sections of a substrate, that stick out toward a light-incident plane. These convex sections correspond to the lands 27L, formed on the substrate 27 (FIG. 1), that stick out toward the light-incident plane 21a, although on-groove recording to the structure L1 is not illustrated in FIG. 1.

A dual-layer optical storage medium having a bonding structure, such as, shown in FIG. 1 and disclosed in Japanese Patent Unexamined Publication No. H10(1998)-283682 is better in productivity than that disclosed in Japanese Patent Publication No. H08(1996)-23941.

On-groove recording to the laminated layer structure L1, in such a bonding structure shown in FIG. 1, however, has the following disadvantages:

In FIG. 1, when the recording layer 25 is formed by spin coating, the grooves 27a are well filled with an organic dye, the material of the layer 25, whereas it is difficult to apply the organic dye on the lands 27L with enough and uniform thickness.

This results in that on-groove recording to the laminated layer structure L1 in an optical storage medium having the bonding structure, such as shown in FIG. 1, cannot provide feasible reproduction output characteristics.

Nevertheless, in-groove recording to the laminated layer structure L1 in the on-in recording mechanism, however, has the following disadvantages:

Recording to both of the laminated layer structures L0 and L1 is conducted by denaturalizing the organic dyes of the recording layers 22 and 25.

In recording to the laminated layer structures L0 and L1 with the same laser power, the organic dye of the recording layer 22 is denaturalized enough for superior recording quality whereas that of the recording layer 25 is not denaturalized enough, thus causing inferior recording quality.

Higher laser power to the recording layer 25 causes not only denaturalization of the organic dye of the recording layer 25 but also deformation of the substrate 27 because high power laser is focused on the center section of each groove 27G of the laminated layer structure L1.

The following is a possible reason of such unfeasible phenomenon:

In the optical storage medium D2 having the bonding structure, shown in FIG. 1, the semi-transparent film 23 is formed substantially flat on the recording layer 22 in the laminate layer structure L0. Contrary to this, in the laminated layer structure L1, the reflective film 26 is formed on the substrate 27 before the recording layer 25 is formed so that the film 26 has concave and convex sections like the grooves 27G and the lands 27L.

In other words, the organic dye of the recording layer 22 in each groove 21G is contact with the semi-transparent film 23 only at the upper surface of the dye in the laminated layer structure L0. On the contrary, in the laminated layer structure L1, the organic dye of the recording layer 25 in each groove 27G is contact with the reflective film 26 at side walls and the lower surface of the dye.

The reflective film 26 exhibits high thermal conductivity because it is made of a metal, an alloy or a metal compound.

Such thermal property could cause dissipation of heat carried by a laser beam to the recording layer 25 through the reflective film 26 contacted with the groove side walls. Unfeasible heat dissipation would not allow enough thermal action to the organic dye of the recording layer 25, which results in insufficient denaturalization of the dye, thus not giving high modulation rate.

SUMMARY OF THE INVENTION

A purpose of the present invention is to provide a dual-layer optical storage medium that exhibits excellent recording characteristics even in in-groove recording.

The present invention provides an optical disk comprising: a first laminated layer structure including a first transparent substrate having a first surface and a second surface on both sides thereof, provided on the first surface being a light-incident plane via which a light beam is to be incident in recording or reproduction, formed alternately on the second surface being a plurality of first lands and first grooves, and a first organic-dye recording layer formed on the second surface to cover the first lands and grooves; a second laminated layer structure including a second substrate, alternately formed on which are a plurality of second lands and second grooves, a reflective film formed on the second transparent substrate to cover the second lands and grooves, and a second organic-dye recording layer formed on the reflective film to face the second transparent substrate; and a bonding layer via which the first and the second laminated layer structures are bonded to each other so that the first and second recording layers are provided between the first and second substrates, wherein a formula $\alpha1 \geq \cos^{-1}(2O/Tb)$ is satisfied in which Tb is a thickness of the reflective film formed on a bottom of each second groove and $\alpha1$ is an angle between a plane passing through an upper surface of each second land and a side wall of each second groove.

DETAILED DESCRIPTION OF PREFERRED EMBODIMENT

Figure 2:
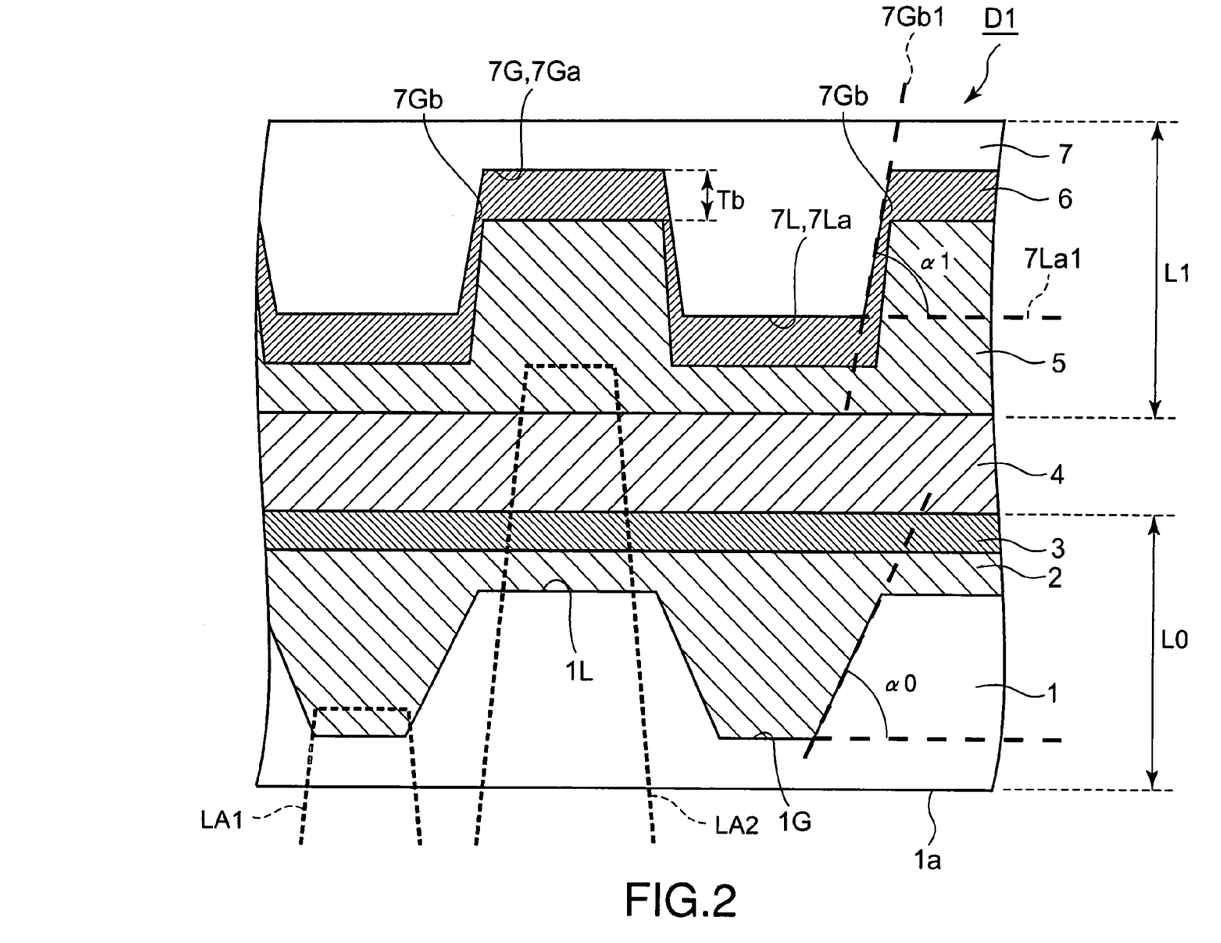
FIG. 2 shows an optical storage medium according to the present invention.

An embodiment of the optical storage medium according to the present invention will be disclosed with reference to FIG. 2.

It is noted that, although the structures of the optical storage media illustrated in FIGS. 1 and 2 are seemed to be similar, the present invention has unique features on grooves and lands formed on a substrate and also a reflective film formed thereon, as disclosed later, thus any skilled in the art cannot reach the present invention, without knowing such unique features.

An embodiment of the optical storage medium according to the present invention disclosed with reference to FIG. 2 is a write-once dual-layer optical disk (DVD-R). The present invention is, however, applicable to other types of dual-layer optical disks, dual-layer optical cards, etc., having a similar structure.

FIG. 2 shows an enlarged sectional view of an embodiment of an optical storage medium D1 according to the present invention.

The optical storage medium D1 has a first laminated layer structure L0 and a second laminated layer structure L1.

The laminated layer structure L0 consists of a transparent substrate 1, an organic-dye recording layer 2, and a semi-transparent film 3, the layer 2 and film 3 being laminated in order on the substrate 1.

One surface of the substrate 1 is a light-incident plane 1a via which a laser beam is incident in recording or reproduction. Lands 1L and grooves 1G are alternately formed on the other surface of the substrate 1.

The laminated layer structure L1 consists of a transparent substrate 7, a reflective film 6, and an organic-dye recording layer 5, the film 6 and layer 5 being laminated in order on the substrate 7.

Lands 7L and grooves 7G are alternately formed on a surface of the substrate 7. Each land 7L has an upper surface 7La. Each groove 7G has a bottom surface 7Ga and side walls 7Gb.

The semi-transparent film 3 of the laminated layer structure L0 and the recording layer 5 of the laminated layer structure L1 are bonded to each other via a bonding layer 4 so that the lands 1L and the grooves 7G face each other and also the grooves 1G and the lands 7L face each other, as shown in FIG. 2.

It is illustrated in FIG. 2 that the lands 1L and the grooves 7G face each other and also the grooves 1G and the lands 7L face each other. The lands 1L and the grooves 7G and/or the grooves 1G and the lands 7L may, however, be displaced from each other in transversal directions on the substrates, depending on production accuracy.

Further layers may be provided in the laminated layer structure L0 and/or the laminated layer structure L1 for higher performance, reliability, etc.

In recording or reproduction, a laser beam LA1 is incident on the laminated layer structure L0 via the light-incident plane la and focused on the recording layer 2 whereas a laser beam LA2 is incident on the laminated layer structure L1 via the plane la and focused on the recording layer 5.

The bonding layer 4 requires about 50 μm in thickness in order for the laser beams LA1 and LA2 to be accurately focused on the recording layers 2 and 5, respectively.

The laminated layer structure L0 is disclosed first in detail.

A suitable material for the substrate 1 is a transparent material, such as, a transparent synthetic resin or a transparent glass.

Suitable synthetic resins are polycarbonate resin, polymethylmethacrylate resin, polyolefin resin, epoxy resin, and polyimide resin. Most acceptable material is polycarbonate resin for low birefringence and hygroscopicity, and also easiness to process.

The thickness of the substrate 1 is preferably 0.6 mm in compatibility with DVD having the total thickness of 1.2 mm, or in order that the storage medium Dl, the embodiment as DVD-R, be reproducible on existing DVD players.

The substrate 1 may be flexible or rigid. A flexible substrate 1 is used for tape-, sheet- or card-type optical storage media whereas a rigid substrate 1 for card- or disk-type optical storage media.

Prepared first in production of the substrate 1 in DVD-R is a stamper having 0.74 μm-pitch spiral or concentric concave and convex sections (grooves) formed thereon. The stamper is produced to meet specific injection requirements so that its concave and convex sections can be accurately transferred onto the substrate 1 in injection molding.

In stamper preparation, generally, a glass plate is coated with a resist at a given thickness and then exposed to a laser beam at adjusted power so that grooves can be cut into the plate from inner to outer edges at desired depth.

For a DVD-R stamper, land pre-pits (LPP) are simultaneously formed with grooves on the glass plate with two-beam cutting.

Then, a DVD-R stamper is finished through regular processes, such as development and nickel plating.

The substrate 1 produced from the stamper that is produced through the regular processes described above has a side-wall angle α0 (FIG. 2) in the range from 20 to 80 degrees for each groove 1G.

The side-wall angle α0 for each groove 1G in the laminated layer structure L0 may be equal to or different from a side-wall angle α1 for each groove 7G in the laminated layer structure L1, which will be discussed later.

Materials for the recording layer 2 are an organic dye, such as cyanine, phthalocyanine, or azoic dye.

The organic dye is applied on the substrate 1 by spin coating with ingredient adjustments and optimization of differential thermal characteristics, wavelength characteristics, etc.

Spin coating requires highly accurate organic-dye temperature managements and environmental temperature-humidity managements, preferably, within ±0.1° C., for uniform film thickness.

The thickness of the recording layer 2 is determined by measuring absorbance of the organic dye at the maximum absorbance wavelength. An acceptable range of absorbance is from 0.55 to 0.8 Abs, although depending on dye types and ingredient adjustments. The lower the absorbance, the smaller the modulation rate whereas the higher the absorbance, the larger the jitter.

Preferable materials for the semi-transparent film 3 are a metal, such as Al, Au or Ag, an alloy of any of these metals as a major component with at least one type of metal or semiconductor, and a mixture of a metal, such as Al, Au or Ag, and a metal nitride, a metal oxide or a metal chalcogen of Al, Si, etc.

Most preferable among them is a metal, such as Al, Au or Ag or an alloy of any of these metals as a major component, for high reflectivity and thermal conductivity.

A typical alloy for the semi-transparent film 3 is made of Al (major component) and at least one of the following elements: Si, Mg, Cu, Pd, Ti, Cr, Hf, Ta, Nb, Mn, Zr, etc., or Au or Ag (major component) and at least one of the following elements: Cr, Ag, Cu, Pd, Pt, Ni, In, Ca, etc.

Lower thermal conductivity causes lower thermal diffusion in recording with laser radiation which further causes inferior recording characteristics, such as unstable stretch of mark edges and effects of adjacent tracks. This leads to a thicker semi-transparent film 3.

A material that cannot provide a thinner semi-transparent film 3 causes lower transmittancy in recording/reproduction in/from the laminated layer structure L1, which will be discussed later.

Under these situations, most preferable material for the semi-transparent film 3 is Ag or an alloy of Ag (main component) for high linear-velocity recording.

The semi-transparent film 3 requires a thickness to exhibit a transmittancy of about 50% for allowing a laser beam to pass therethrough in recording or reproduction to or from the laminate layer structure L1. A preferable range of the film thickness is from 5 to 20 nm, depending on thermal conductivity of the material used. The thickness below 5 nm gives lower reflectivity and lower cooling speed, thus affecting recording. In contrast, the thickness over 20 nm gives lower transmittancy below 50% to a laser beam, thus unfeasible for dual-layer optical storage media.

The semi-transparent film 3 can be formed on the recording layer 2 by a vacuum thin-film forming technique, such as, vacuum deposition with resistive heating or electron bombardment, ion plating or (D.C., A.C. or reactive) sputtering. The most feasible among these techniques is sputtering for easiness of composition and film-thickness control.

The laminated layer structure L1 is disclosed next in detail.

The material, thickness and other requirements for the substrate 7 are the same as for the substrate 1 of the laminated layer structure L0 discussed above.

A stamper for transferring grooves onto the substrate 7 is produced as follows:

A glass plate is subjected to glass etching after exposed to a laser beam in the same way as the stamper for the substrate 1 of the laminated layer structure L0 discussed above. After developed, the glass plate is placed in a reactive ion etching apparatus for glass etching. The regions on the glass plate to become grooves are only exposed by O$_2$-gas ashing. This is followed by further glass etching to a desired groove depth with gas, such as $CF_4$, $CHF_3$, etc.

These processes give grooves having a steep side-wall angle. The angle can be adjusted according to etching requirements (etching power, etching-gas pressure, etc.).

A stamper for the substrate 7 is then produced from the glass plate having the grooves formed as disclosed above, through the same regular processes as for the stamper for the substrate 1.

The material, layer thickness and dye-application requirements for the recording layer 5 are the same as for the recording layer 2 of the laminated layer structure L0 discussed above.

Although not shown in FIG. 2, a protective layer may be formed on the recording layer 5 to protect this layer when the laminated layer structures L0 and L1 are bonded to each other via the bonding layer 4.

Such a protective layer is preferably made of a material including at least one of the substances: a nitride, an oxide and a carbide, for example, including at least one of the substances: germanium nitride, silicon nitride, aluminum nitride, aluminum oxide, zirconium oxide, chromium oxide, carbon, and silicon carbide. Oxygen, nitrogen or hydrogen may be added to the material of the protective layer.

The nitride, oxide and carbide listed above may not be stoichiometric compositions for such a protective layer. In other words, nitrogen, oxygen or carbon may be excessive or insufficient, which could offer high performance, such as high durability in that the protective layer is hardly peeled off from the bonding layer 4.

A compound of ZnS and $SiO_2$ is the most preferable material for the protective layer.

Preferable materials for the reflective film 6 are a metal, such as Al, Au or Ag, and an alloy of any of these metals as a major component, for high reflectivity and thermal conductivity. Preferable alloy examples are the same as for the semi-transparent film 3.

The thickness of the reflective film 6 is preferably in the range from 30 to 100 nm, depending on the thermal conductivity of the material used. The thickness of 50 nm or more gives substantially the same reflectivity but lower cooling speed, over 100 nm further lower cooling speed which causes insufficient recording.

Like discussed with respect to FIG. 1, the reflective film 6 could affect the recording characteristics of the laminated layer structure L1. Especially, the recording characteristics depends on the thickness of the film 6 formed on the groove side walls 7Gb.

It is difficult to directly measure the side-wall thickness. Thus, approximation is made as discussed below for the reflective film 6 formed by sputtering in a sputtering apparatus that gives high straight mobility for sputtered particles.

Approximation is made by using the following formula:

$$B = Tb \cos \alpha 1 \quad (1)$$

in which B is a side-wall thickness of the reflective film 6 formed on a side wall 7Gb of each groove 7G, Tb is a bottom thickness of the reflective film 6 formed on a bottom 7Ga of each groove 7G, and $\alpha 1$ is an angle (side-wall angle) between a plane 7La1 passing through an upper surface 7La of each land 7L and a plane 7Gb1 passing through the side wall 7Gb of each groove 7G, as shown in FIG. 2.

The thickness (side-wall thickness B) of the reflective film 6 formed on each groove side-wall 7Gb is discussed by using the side-wall angle $\alpha 1$ as a parameter.

In the following discussion, the side-wall thickness B is defined as the thickness of the reflective film 6 formed on each groove side wall 7Gb at 50% in depth of each groove 7G.

The approximation formula (1) teaches the thinner the bottom thickness Tb, the better, as long as the reflective film 6 formed on each groove bottom 7Ga exhibits acceptably high reflectivity, which makes thinner the side-wall thickness B.

A thicker thickness Tb requires a steeper side-wall angle $\alpha 1$ for a thinner side-wall thickness B, even though acceptable reflectivity is still maintained.

As the side-wall angle $\alpha 1$ becomes steeper, a projected area on a sputtering target is decreased for each groove side wall 7Gb, and the side-wall thickness B of the reflective film 6 becomes thinner accordingly.

Therefore, it is concluded by the inventors of the present invention that a side-wall angle $\alpha 1$ that satisfies a formula (2) shown below serves to restrict heat dissipation from the recording layer 5 via the reflective film 6 formed on each side wall 7Gb of the grooves 7G formed on the substrate 7 in the laminated layer structure L1.

$$\alpha 1 \geq \cos^{-1}(20/Tb) \quad (2)$$

in which Tb is a bottom thickness of the reflective film 6 formed on the bottom 7Ga of each groove 7G, as defined above.

The right side of the formula (2) indicates a critical side-wall angle that gives 20 nm to the side-wall thickness B of the reflective film 6 formed on each groove side wall 7Gb. The formula (2) teaches that a feasible side-wall angle $\alpha 1$ is equal to or larger than the critical side-wall angle.

In other words, an optical storage medium D1 having a side-wall angle $\alpha 1$ and a bottom thickness Tb that satisfy the formula (2) exhibits 20 nm in the maximum side-wall thickness B.

The side-wall thickness B at 20 nm or less serves to decrease heat dissipation from the recording layer 5 via the reflective film 6 formed on each groove side wall 7Gb, to a level or lower at which recording is not affected.

A most acceptable range for the bottom thickness Tb of the reflective film 6 to satisfy the formula (2) is from 30 to 100 nm.

A wider distance between a target and a substrate in a sputtering apparatus gives higher straight mobility to sputtered particles to restrict the side-wall thickness B of the reflective film 6, thus could enhancing advantages of the present invention. Nevertheless, such a distance adjustment only is not practical because it drastically lowers a sputtering rate.

The laminated layer structures L0 and L1 disclosed above are then bonded to each other via the bonding layer 4 so that the recording layers 2 and 5 face each other between the substrates 1 and 7. The bonding layer 4 may be an ultra-violet cured resin or a double-sided adhesive sheet. It requires a thickness of about 50 μm in order for that the laser beams LA1 and LA2 be accurately focused on the recording layers 2 and 5, respectively, as discussed above.

Discussed next is evaluation of samples 1 to 9 of the embodiment according to the present invention and comparative samples 1 to 10.

The samples and comparative samples were produced as dual-layer DVD-Rs as explained below.

All of the samples and comparative samples had identical laminated layer structures L0 formed under the same requirements.

In detail, the substrate 1 of each laminated layer structure L0 was produced as having 0.6 mm in thickness by polycarbonate-resin injection molding with a stamper having 0.74 μm-pitch spiral grooves in accordance with the DVD-R format.

The recording layer 2 of each laminated layer structure L0 was formed as having a thickness to exhibit 0.7 Abs in absorbance by spin coating a cyanine organic dye on the substrate 1, with ingredient and viscosity adjustments and optimization of differential thermal characteristics, wavelength characteristics, etc.

The semi-transparent film 3 of each laminated layer structure L0 was formed on the recording layer 2 by sputtering with an Al alloy, as having 10 nm in thickness.

The samples and comparative samples had different laminated layer structures L1 produced as explained below.

In detail, each substrate 7 was produced as having 0.6 mm in thickness by polycarbonate-resin injection molding with a stamper having 0.74 μm-pitch spiral grooves in accordance with the DVD-R format. The stamper for the substrate 7 was identical to that for the substrate 1, but groove spiral directions being opposite to each other to have a groove and land relationship between the laminated layer structures L0 and L1 as shown in FIG. 2. The side-wall angle α1 was varied according to the samples and comparative samples, as explained later.

The reflective film 6 was formed on each substrate 7 by sputtering with an Al alloy. The film bottom thickness Tb defined in the formula (2) was varied according to the samples and comparative samples, as explained later.

The recording layer 5 was formed as having a thickness to exhibit 0.7 Abs in absorbance by spin coating a cyanine organic dye on each reflective film 6, with ingredient and viscosity adjustments and optimization of differential thermal characteristics, wavelength characteristics, etc.

The laminated layer structures L0 and L1 were then bonded to each other via the bonding layer 4, a double-sided adhesive sheet having a thickness of 50 μm, for each sample and comparative sample.

The total optical-disk thickness was 1.2 mm for all of the samples and comparative samples.

The sample and comparative sample optical disks produced as explained above were subjected to (one-beam overwrite) test recording and measurements with an optical-disk drive tester (DDU1000) equipped with a 658 nm-wavelength laser diode and an optical lens (NA=0.60) made by Pulstec. Co.

The test recording was conducted with 8-16 modulation random patterns having a pitch length of 267 μm/bit, at a linear velocity and a clock period T of 3.5 m/s and 38.4 nsec., respectively (both corresponding to ×1 speed in DVD), under the recording strategy (pulse pattern) with multiple pulse sequences defined in the DVD-R version 2.0.

Modulation rate (MOD), reflectivity, pushpull (PP), etc., were measured after one test recording to a target track and adjacent tracks.

Recorded signals were reproduced at a constant reproduction power Pr of 0.7 mW and subjected to slicing at its amplitude center for measurements of clock to data jitters.

The measurements showed that all of the laminated layer structures L0 of the samples and comparative samples exhibited 60% or higher in modulation rate and also 50% or higher in transmittancy, meeting required specifications defined the DVD-R version 2, such as, 60% or higher in modulation rate, 18% or higher in reflectivity and 0.22 or higher in pushpull.

The same test recording and measurements were applied to the laminate layer structures L1 of the samples and comparative samples.

The film thickness and side-wall angle requirements and measured results are shown in TABLE 1 below for the samples and comparative samples. The film thicknesses and side-wall angles in the samples all satisfied the formula (2).

TABLE 1

|  | BT. THICKNESS (nm) | SW. ANGLE (deg) | CT. SW. ANGLE (deg) | MOD. (%) | REF. (%) | REC. POWER (mW) |
|---|---|---|---|---|---|---|
| SP-1 | 50 | 70 | 66 | 65 | 18.2 | 20 |
| SP-2 | 75 | 75 | 75 | 63 | 18.5 | 25 |
| SP-3 | 100 | 80 | 78 | 62 | 19.2 | 22 |
| SP-4 | 30 | 50 | 48 | 62 | 18 | 19.5 |
| SP-5 | 40 | 80 | 60 | 66 | 18.1 | 21 |
| SP-6 | 50 | 85 | 66 | 70 | 18.1 | 20.5 |
| SP-7 | 70 | 80 | 73 | 64 | 18.6 | 22 |
| SP-8 | 90 | 85 | 77 | 66 | 18.9 | 22.5 |
| SP-9 | 100 | 80 | 78 | 62 | 18.9 | 22 |
| CSP-1 | 50 | 60 | 66 | 50 | 18.1 | 25 |
| CSP-2 | 100 | 70 | 78 | 20 | 19.1 | 35 |
| CSP-3 | 70 | 70 | 73 | 35 | 18.6 | 30 |
| CSP-4 | 200 | 85 | 84 | 60 | 19.3 | 30 |
| CSP-5 | 30 | 45 | 48 | 59 | 18 | 30 |
| CSP-6 | 28 | 45 | 44 | 58 | 17 | 29 |
| CSP-7 | 110 | 85 | 80 | 58 | 19 | 28 |
| CSP-8 | 25 | 70 | 37 | 70 | 17.7 | 19.2 |
| CSP-9 | 100 | 75 | 78 | 25 | 19.1 | 33 |
| CSP-10 | 80 | 55 | 76 | 18 | 18.7 | 38 |

Discussed below with reference to TABLE 1 is evaluation of the sample and comparative sample dual-layer optical disks D1 having the identical laminated layer structures L0 but different laminated layer structures L1 produced under different requirements.

(Sample 1)

Requirements for the laminated layer structure L1 of a sample-1 (SP-1) dual-layer optical disk D1 were: 70 degrees in side-wall angle (SW. ANGLE) α1 of each groove 7G, and 50 nm in bottom thickness (BT. THICKNESS) Tb of the reflective film 6 formed on the bottom 7Ga of each groove 7G.

Since the bottom thickness Tb is 50 nm, the critical side-wall angle (CT. SW. ANGLE) was 66 degrees given by the formula (2) as follows: $66=\cos^{-1}(20/50)$.

The measurements showed that the SP-1 optical disk D1 exhibited 65% in modulation rate (MOD.), 18.2% in reflectivity (REF.) and 20 mW in recording power (REC. POWER), extremely excellent performance.

(Sample 2)

Requirements for the laminated layer structure L1 of a sample-2 (SP-2) dual-layer optical disk D1 were: 75 degrees in side-wall angle α1 of each groove 7G, and 75 nm in bottom thickness Tb of the reflective film 6.

The critical side-wall angle was 75 degrees for the SP-2 optical disk D1.

The measurements showed that the SP-2 optical disk D1 exhibited 63% in modulation rate, 18.5% in reflectivity and 25 mW in recording power, fairly excellent performance. The recording power was slightly higher than the sample 1, but within an allowable range.

(Sample 3)

Requirements for the laminated layer structure L1 of a sample-3 (SP-3) dual-layer optical disk D1 were: 80 degrees in side-wall angle α1 of each groove 7G, and 100 nm in bottom thickness Tb of the reflective film 6.

The critical side-wall angle was 78 degrees for the SP-3 optical disk D1.

The measurements showed that the SP-3 optical disk D1 exhibited 62% in modulation rate, 19.2% in reflectivity and 22 mW in recording power, all within allowable ranges.

(Sample 4)

Requirements for the laminated layer structure L1 of a sample-4 (SP-4) dual-layer optical disk D1 were: 50 degrees in side-wall angle α1 of each groove 7G, and 30 nm in bottom thickness Tb of the reflective film 6.

The critical side-wall angle was 48 degrees for the SP-4 optical disk D1.

The measurements showed that the SP-4 optical disk D1 exhibited 62% in modulation rate and 19.5 mW in recording power, both within the allowable ranges, but 18.0% in reflectivity, lowest in the allowable range due to thinness in reflective film.

(Sample 5)

Requirements for the laminated layer structure L1 of a sample-5 (SP-5) dual-layer optical disk D1 were: 80 degrees in side-wall angle α1 of each groove 7G, and 40 nm in bottom thickness Tb of the reflective film 6.

The critical side-wall angle was 60 degrees for the SP-5 optical disk D1.

The measurements showed that the SP-5 optical disk D1 exhibited 66% in modulation rate and 21.0 mW in recording power, both within the allowable ranges, but 18.1% in reflectivity, almost lowest in the allowable range due to thinness in reflective film.

(Sample 6)

Requirements for the laminated layer structure L1 of a sample-6 (SP-6) dual-layer optical disk D1 were: 85 degrees in side-wall angle α1 of each groove 7G, and 50 nm in bottom thickness Tb of the reflective film 6.

The critical side-wall angle was 66 degrees for the SP-6 optical disk D1.

The measurements showed that the SP-6 optical disk D1 exhibited 70% in modulation rate and 20.5 mW in recording power, both within the allowable ranges, but 18.1% in reflectivity, almost lowest in the allowable range due to thinness in reflective film.

(Sample 7)

Requirements for the laminated layer structure L1 of a sample-7 (SP-7) dual-layer optical disk D1 were: 80 degrees in side-wall angle α1 of each groove 7G, and 70 nm in bottom thickness Tb of the reflective film 6.

The critical side-wall angle was 73 degrees for the SP-7 optical disk D1.

The measurements showed that the SP-7 optical disk D1 exhibited 64% in modulation rate and 22.0 mW in recording power, both within the allowable ranges, but 18.6% in reflectivity, relatively low in the allowable range due to thinness in reflective film.

(Sample 8)

Requirements for the laminated layer structure L1 of a sample-8 (SP-8) dual-layer optical disk D1 were: 85 degrees in side-wall angle α1 of each groove 7G, and 90 nm in bottom thickness Tb of the reflective film 6.

The critical side-wall angle was 77 degrees for the SP-8 optical disk D1.

The measurements showed that the SP-8 optical disk D1 exhibited 66% in modulation rate, 22.5 mW in recording power and 18.9% in reflectivity, all within the allowable ranges.

(Sample 9)

Requirements for the laminated layer structure L1 of a sample-9 (SP-9) dual-layer optical disk D1 were: 80 degrees in side-wall angle α1 of each groove 7G, and 100 nm in bottom thickness Tb of the reflective film 6.

The critical side-wall angle was 78 degrees for the SP-9 optical disk D1.

The measurements showed that the SP-9 optical disk D1 exhibited 62% in modulation rate, 22.0 mW in recording power and 18.9% in reflectivity, all within the allowable ranges.

(Comparative Sample 1)

Requirements for the laminated layer structure L1 of a comparative sample-1 (CSP-1) dual-layer optical disk D1 were the same as for the sample 1 except: 60 degrees in side-wall angle α1 of each groove 7G.

The measurements showed that the CSP-1 optical disk D1 exhibited unacceptable modulation rate and recording power.

In detail, the measured modulation rate was 50% that was below the standard level (60% or higher). It is speculated that the organic dye of the recording layer 5 was not fully denaturalized due to high heat dissipation via the side walls of the reflective film 6 having a thick side-wall thickness B.

The measured recording power was 25 mW, the highest level in the allowable range. Increasing the power over this level to provide enough heat to the recording layer 5 for higher modulation rate caused much jitter.

(Comparative Sample 2)

Requirements for the laminated layer structure L1 of a comparative sample-2 (CSP-2) dual-layer optical disk D1 were the same as for the sample 1 except: 100 nm in bottom thickness Tb of the reflective film 6.

The bottom thickness Tb of 100 nm gave 78 degrees in critical side-wall angle larger than 70 degrees in side-wall angle α1 of each groove 7G.

The measurements showed that the CSP-2 optical disk D1 exhibited unacceptable modulation rate and recording power.

In detail, the measured modulation rate was 20% that was far below the standard level (60% or higher). It is speculated that a very thick side-wall thickness B of the reflective film 6 cooled too much the organic dye of the recording layer 5 at the side walls, which caused insufficient formation of recorded marks (denaturalization of the organic dye).

The measured recording power was 35 mW, out of the allowable range. Increasing the power over this level failed to raise the modulation rate.

(Comparative Sample 3)

Requirements for the laminated layer structure L1 of a comparative sample-3 (CSP-3) dual-layer optical disk D1 were the same as for the sample 1 except: 70 nm in bottom thickness Tb of the reflective film 6.

The bottom thickness Tb of 70 nm gave 73 degrees in critical side-wall angle larger than 70 degrees in side-wall angle α1 of each groove 7G.

The measurements showed that the CSP-3 optical disk D1 exhibited unacceptable modulation rate and recording power.

In detail, the measured modulation rate was 35% that was far below the standard level (60% or higher). It is speculated that a very thick side-wall thickness B of the reflective film 6 accelerated heat dissipation.

The measured recording power was 30 mW, out of the allowable range. Increasing the power over this level failed to raise the modulation rate.

(Comparative Sample 4)

Requirements for the laminated layer structure L1 of a comparative sample-4 (CSP-4) dual-layer optical disk D1 were the same as for the sample 1 except: 200 nm in bottom thickness Tb of the reflective film 6 and 85 degrees in side-wall angle α1 of each groove 7G.

The bottom thickness Tb of 200 nm gave 84 degrees in critical side-wall angle slightly smaller than 85 degrees in side-wall angle α1 of each groove 7G.

The measurements showed that the CSP-4 optical disk D1 exhibited 60% in modulation rate that was the lowest in the standard level (60% or higher) but 30 mw in recording power, out of the allowable range. Increasing the power over this level caused much jitter.

The side-wall angle α1 of 85 degrees at each groove 7G was very steep. This was the maximum angle beyond which the substrate was fallen off from the stamper during injection molding.

(Comparative Sample 5)

Requirements for the laminated layer structure L1 of a comparative sample-5 (CSP-5) dual-layer optical disk D1 were the same as for the sample 1 except: 30 nm in bottom thickness Tb of the reflective film 6 and 45 degrees in side-wall angle α1 of each groove 7G, both being smaller than the sample 1.

The bottom thickness Tb of 30 nm gave 48 degrees in critical side-wall angle slightly larger than 45 degrees in side-wall angle α1 of each groove 7G.

The measurements showed that the CSP-5 optical disk D1 exhibited 59% in modulation rate that was slightly below the standard level (60% or higher) and 30 mw in recording power, out of the allowable range. Increasing the power over this level caused much jitter.

(Comparative Sample 6)

Requirements for the laminated layer structure L1 of a comparative sample-6 (CSP-6) dual-layer optical disk D1 were the same as for the sample 1 except: 28 nm in bottom thickness Tb of the reflective film 6 and 45 degrees in side-wall angle α1 of each groove 7G, both being smaller than the sample 1.

The bottom thickness Tb of 28 nm gave 44 degrees in critical side-wall angle slightly smaller than 45 degrees in side-wall angle α1 of each groove 7G.

The measurements showed that the CSP-6 optical disk D1 exhibited 58% in modulation rate that was slightly below the standard level (60% or higher) and 17.0% in reflectivity that was bellow the standard level (18%). It is speculated that the thickness of 28 nm (very thin in bottom thickness Tb) gave such a low reflectivity.

(Comparative Sample 7)

Requirements for the laminated layer structure L1 of a comparative sample-7 (CSP-7) dual-layer optical disk D1 were the same as for the sample 1 except: 110 nm in bottom thickness Tb of the reflective film 6 and 85 degrees in side-wall angle α1 of each groove 7G.

The bottom thickness Tb of 110 nm gave 80 degrees in critical side-wall angle smaller than 85 degrees in side-wall angle α1 of each groove 7G.

The measurements showed that the CSP-7 optical disk D1 exhibited 58% in modulation rate that was below the standard level (60% or higher) and 28 mw in recording power, out of the allowable range. Increasing the power over this level caused much jitter.

The side-wall angle α1 of 85 degrees larger than the critical side-wall angle of 80 degrees could not give a sufficiently high level in modulation rate.

It is speculated that such a low level in modulation rate was caused by high heat dissipation from the recording layer 5 via the thick bottom of the reflective film 6 in each groove 7G, even though the thickness of the film 6 at the groove side walls was below the critical level.

(Comparative Sample 8)

Requirements for the laminated layer structure L1 of a comparative sample-8 (CSP-8) dual-layer optical disk D1 were the same as for the sample 1 except: 25 nm in bottom thickness Tb of the reflective film 6 and 70 degrees in side-wall angle α1 of each groove 7G.

The bottom thickness Tb of 25 nm gave 37 degrees in critical side-wall angle much smaller than 70 degrees in side-wall angle α1 of each groove 7G.

The measurements showed that the CSP-8 optical disk D1 exhibited 70% in modulation rate and 19.2 mw, both within the allowable ranges, but 17.7% in reflectivity, below the standard level.

(Comparative Sample 9)

Requirements for the laminated layer structure L1 of a comparative sample-9 (CSP-9) dual-layer optical disk D1 were the same as for the sample 1 except: 100 nm in bottom thickness Tb of the reflective film 6 and 75 degrees in side-wall angle α1 of each groove 7G.

The bottom thickness Tb of 100 nm gave 78 degrees in critical side-wall angle larger than 75 degrees in side-wall angle α1 of each groove 7G.

The side-wall angle of 75 degrees smaller than the critical side-wall angle gave a thicker side wall B to the reflective film 6.

The measurements showed that the CSP-9 optical disk D1 exhibited 25% in modulation rate that was extremely below the standard level (60% or higher) and 33 mw in recording power, out of the allowable range. Increasing the power over this level caused much jitter.

(Comparative Sample 10)

Requirements for the laminated layer structure L1 of a comparative sample-10 (CSP-10) dual-layer optical disk D1 were the same as for the sample 1 except: 80 nm in bottom thickness Tb of the reflective film 6 and 55 degrees in side-wall angle α1 of each groove 7G.

The bottom thickness Tb of 80 nm gave 76 degrees in critical side-wall angle much larger than 55 degrees in side-wall angle α1 of each groove 7G.

The side-wall angle of 55 degrees much smaller than the critical side-wall angle gave a thick side wall B of 46 nm (in calculation) to the reflective film 6.

The measurements showed that the CSP-10 optical disk D1 exhibited 18% in modulation rate that was far below the standard level (60% or higher) and 38 mw in recording power, out of the allowable range. Increasing the power over this level caused much jitter.

As discussed above in detail with respect to the several samples and comparative samples, the present invention achieves excellent recording characteristics in dual-layer optical storage media in which two recording layers face each other as sandwiched by two opposing substrates, with restriction of heat dissipation from the laminated layer structure L1 via the reflecting film, which may otherwise occur in in-groove recording to the structure L1.

What is claimed is:

1. An optical disk comprising:
   a first laminated layer structure including a first transparent substrate having a first surface and a second surface on both sides thereof, provided on the first surface being a light-incident plane via which a light beam is to be incident in recording or reproduction, formed alternately on the second surface being a plurality of first lands and first grooves, and a first organic-dye recording layer formed on the second surface to cover the first lands and grooves;

a second laminated layer structure including a second substrate, alternately formed on which are a plurality of second lands and second grooves, a reflective film formed on the second substrate to cover the second lands and grooves, and a second organic-dye recording layer formed on the reflective film to face the second substrate; and a bonding layer via which the first and the second laminated layer structures are bonded to each other so that the first and second recording layers are provided between the first and second substrates, wherein a formula $\alpha 1 \geq \cos^{-1}(20/Tb)$ is satisfied in which Tb is a thickness of the reflective film formed on a bottom of each second groove and $\alpha 1$ is an angle between a plane passing through an upper surface of each second land and a side wall of each second groove.

2. The optical disk according to claim 1 wherein the thickness Tb of the reflective film formed on the bottom of each second groove is in the range from 30 nm to 100 nm.

* * * * *